(12) United States Patent
Johnson

(10) Patent No.: US 7,271,350 B2
(45) Date of Patent: Sep. 18, 2007

(54) SURFACE MOUNTED SUPPORT ASSEMBLY

(75) Inventor: Steven J. Johnson, Galien, MI (US)

(73) Assignee: Hubbell Incorporated, Orange, CT (US)

( * ) Notice: Subject to any disclaimer, the term of this patent is extended or adjusted under 35 U.S.C. 154(b) by 36 days.

(21) Appl. No.: 10/917,526

(22) Filed: Aug. 13, 2004

(65) Prior Publication Data

US 2006/0032651 A1 Feb. 16, 2006

(51) Int. Cl.
*H02B 1/40* (2006.01)

(52) U.S. Cl. .................. 174/480; 174/481; 174/54; 174/61; 248/343; 248/205.1

(58) Field of Classification Search ............... 174/48, 174/50, 53, 58, 63, 61, 62, 57, 54, 480, 481, 174/503; 220/3.2, 3.3, 3.4, 3.5, 3.6, 3.7, 220/3.8, 4.02; 248/906, 343, 27.1, 205.1; 211/26, 71.01
See application file for complete search history.

(56) References Cited

U.S. PATENT DOCUMENTS

| | | | |
|---|---|---|---|
| 2,215,331 A | | 9/1940 | Marsh |
| 2,602,623 A | * | 7/1952 | Sperry ..................... 248/343 |
| 3,798,584 A | * | 3/1974 | Person ..................... 174/62 |
| 5,183,233 A | | 2/1993 | LaPalomento |
| 5,624,202 A | * | 4/1997 | Grierson ................... 248/343 |
| 5,900,583 A | | 5/1999 | Russo |
| 5,916,094 A | | 6/1999 | Gretz |
| 6,168,285 B1 | | 1/2001 | Flohre |
| 6,465,736 B1 | | 10/2002 | Spadaro |
| 6,595,664 B2 | * | 7/2003 | Bucher et al. ............. 248/343 |
| 6,653,558 B1 | * | 11/2003 | Bucher et al. ............. 174/50 |
| 6,877,703 B2 | * | 4/2005 | Tang ........................ 248/343 |
| 6,991,352 B2 | * | 1/2006 | Garber et al. ............. 248/343 |

* cited by examiner

*Primary Examiner*—Angel R. Estrada
(74) *Attorney, Agent, or Firm*—Marcus R. Mickney; Mark S. Bicks; Alfred N. Goodman

(57) ABSTRACT

A surface mounted support assembly that is alignable with an electrical box installed at any position. A first bracket is adapted to be secured to the support and has a plurality of openings adapted to receive wiring from an electrical box secured to the support. A cover is connected to and disposed over the first bracket the first bracket. A cover ring is connected to the cover and adapted to receive an electrical fixture.

24 Claims, 6 Drawing Sheets

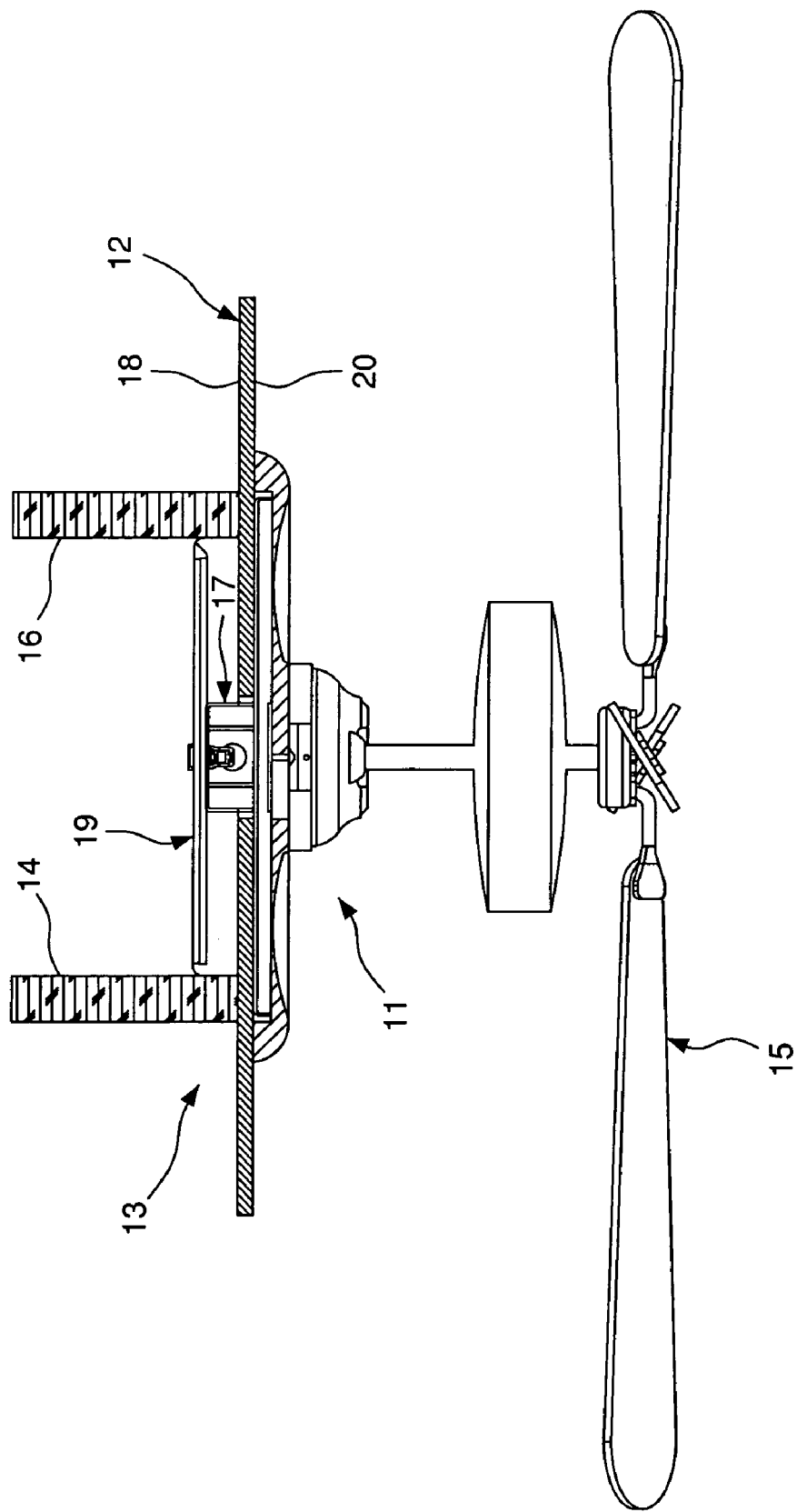

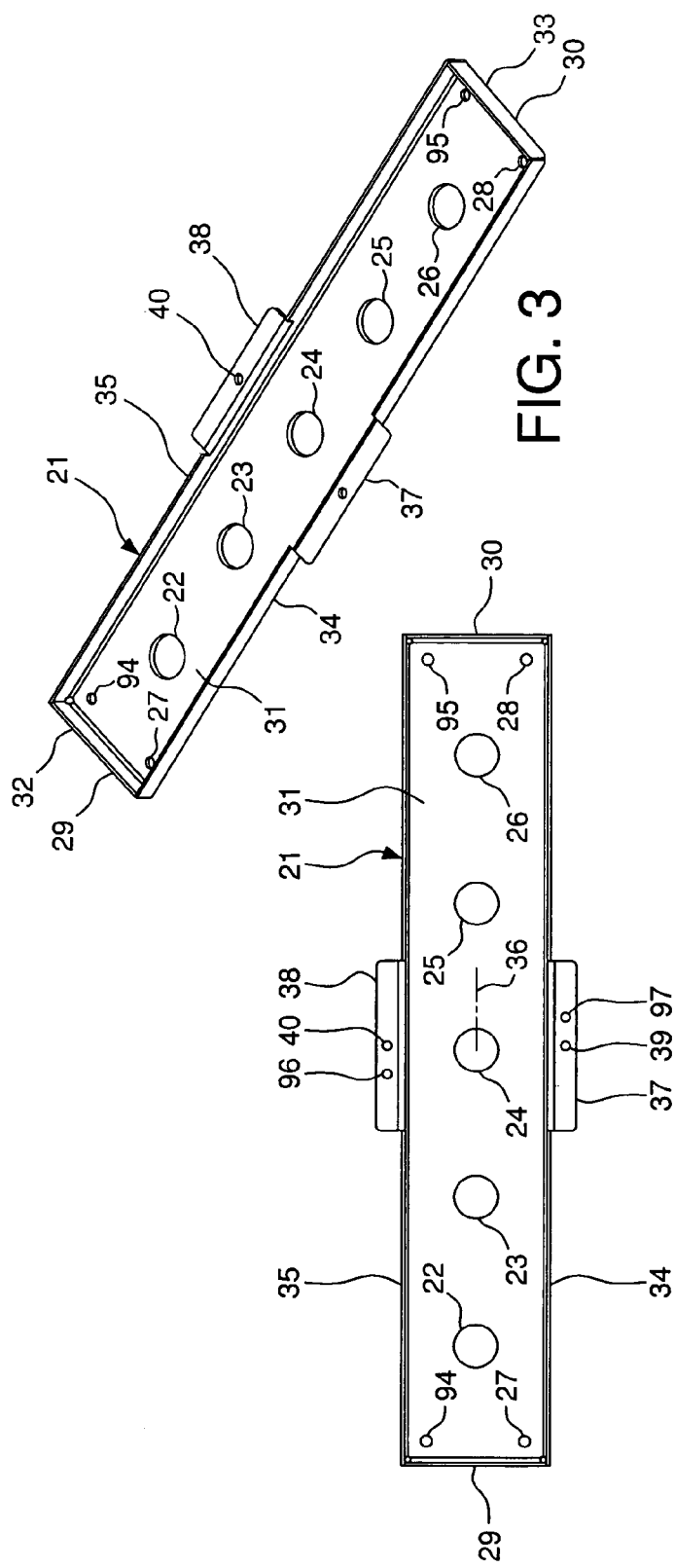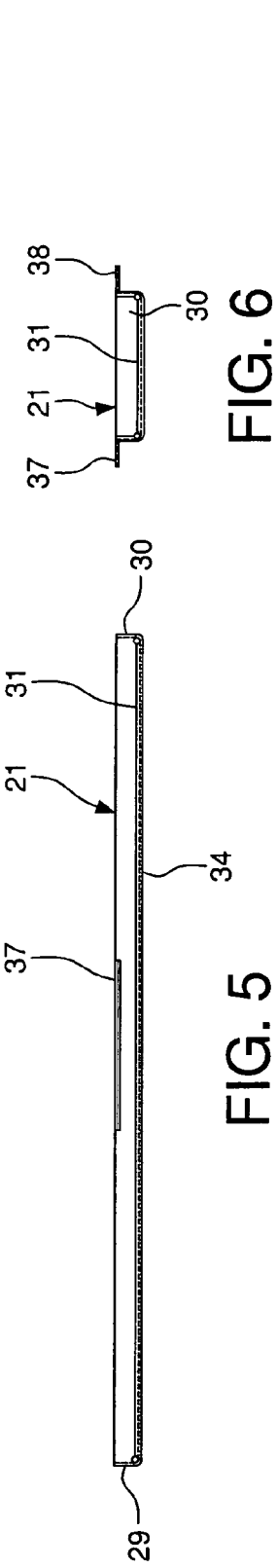

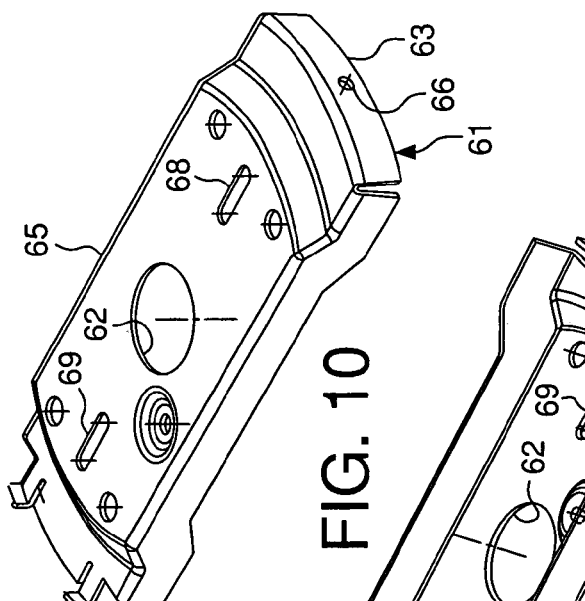
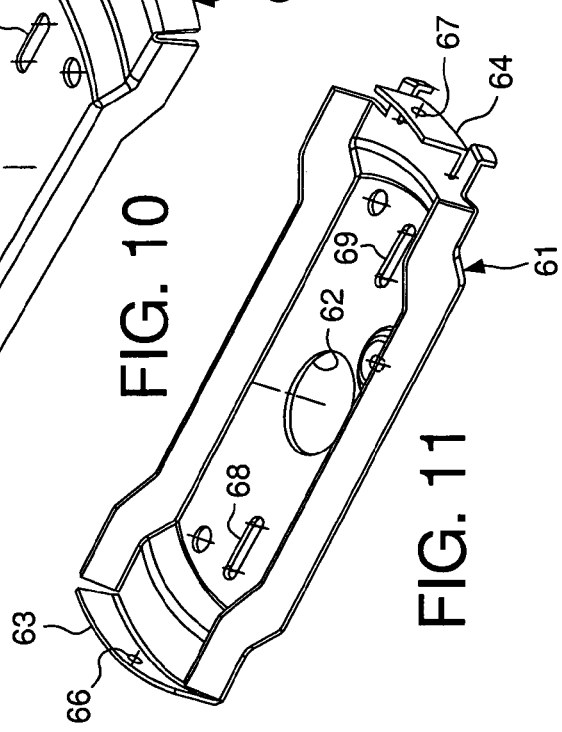
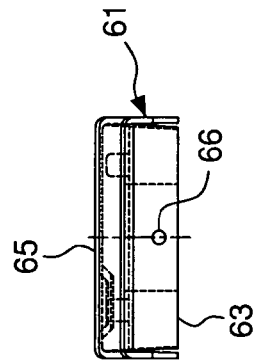
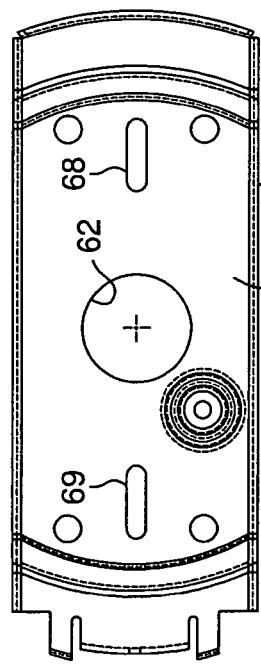
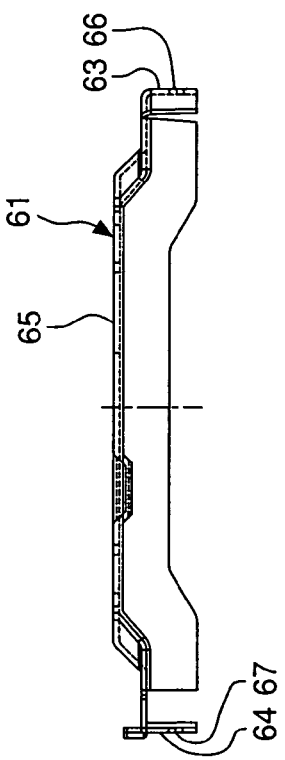

SURFACE MOUNTED SUPPORT ASSEMBLY

FIELD OF THE INVENTION

The present invention relates to a surface mounted support assembly. More particularly, the present invention relates to a surface mounted support assembly for connecting an electrical fixture to an existing electrical box. Still more particularly, the present invention relates to a surface mounted support assembly including a mounting bracket having a plurality of openings to facilitate passing electrical wires from an electrical box through the mounting bracket into an electrical fixture.

BACKGROUND OF THE INVENTION

Many electrical fixture mounting assemblies exist for mounting an electrical fixture from a support positioned on the upper surface of a ceiling drywall. Typically, a brace is mounted between parallel joists that support the ceiling drywall. A bracket is then positioned onto the brace. An electrical box is then attached to the lower side of the brace by the bracket and fasteners. The electrical box is now securely mounted to the brace so that it may support an electrical fixture. Once the ceiling drywall has been installed, an aperture is made in the ceiling drywall to allow electrical cables to be passed from the electrical box to the electrical fixture.

Surface mounted support assemblies are then used to connect the electrical fixture to the electrical box. A mounting bracket of the support assembly is generally mounted flush with a lower surface of the ceiling drywall. A cover is mounted over the mounting bracket to conceal the bracket from view to provide an aesthetic appearance and to receive the electrical fixture.

One problem with existing surface mounted support assemblies is that the support assemblies do not account for the electrical box being mountable at any position along the length of the brace between the two joists. Mounting brackets used with the support assemblies have a centrally located wire opening to pass electrical wires from the electrical box to the electrical fixture. If the electrical box is not centrally positioned between the two joists, then the aperture formed in the ceiling drywall is not aligned with the centrally located wire opening in the mounting bracket. The lack of alignment between the ceiling drywall aperture and the mounting bracket wire opening makes it extremely difficult or impedes passing the electrical wires from the electrical box to the electrical fixture since the mounting bracket is typically mounted flush with the ceiling drywall. A need exists for a mounting bracket for a surface mounted support assembly that easily allows for passing of electrical wires from the electrical box to the electrical fixture for any electrical box position on the brace assembly between the two joists.

Another problem with surface mounted support assemblies is the inability of mounting brackets to accommodate existing electrical box installations. As discussed above, some mounting brackets are incapable of being used with non-centrally installed electrical boxes. Other mounting brackets are incapable of being secured to existing ceiling supports. A need exists for a surface mounted support assembly that is capable of being secured to existing electrical boxes and receiving electrical fixtures.

Another problem is that not all ceiling boxes are rated for an electrical fixture desired to be installed. If a certain electrical fixture is desired to be installed and the existing ceiling box is not rated for that fixture, the existing ceiling box must be removed and an appropriately rated ceiling box must be installed prior to installing the desired electrical fixture. In some instances, a ceiling box is not pre-existing and an appropriately rated ceiling box must be installed prior to installing a desired electrical fixture. A need exists for a surface mounted support assembly that is capable of installing an electrical fixture notwithstanding the type of existing ceiling box or in the absence of a ceiling box.

Examples of existing surface mounted fixture supports are disclosed in the following U.S. Pat. Nos.: 2,215,331 to Marsh; U.S. Pat. No. 5,183,233 to LaPalomento; and U.S. Pat. No. 5,900,583 to Russo.

A need exists for an improved surface mounted support assembly.

SUMMARY OF THE INVENTION

Accordingly, it is a primary objective of the present invention to provide an improved surface mounted support assembly.

Accordingly, another objective of the present invention is to provide a surface mounted support assembly that is retrofittable to existing installed electrical boxes.

Accordingly, another objective of the present invention is to provide a mounting bracket for a surface mounted support assembly having wire openings alignable with an electrical box installed at any position.

Accordingly, another objective of the present invention is to provide a surface mounted support assembly that is capable of installing an electrical fixture despite the type of existing ceiling box or in the absence of a ceiling box.

The foregoing objects are basically attained by providing a surface mounted support assembly. A first bracket is adapted to be secured to a support and has a plurality of openings adapted to receive wiring from an electrical box secured to the support. A cover is connected to and disposed over the first bracket. A cover ring is connected to the cover and adapted to receive an electrical fixture.

The foregoing objects are also basically attained by providing a method of securing a surface mounted support assembly to an existing electrical box. A first bracket is secured to first and second support members. Electrical wires are passed from the electrical box through one of a plurality of openings in the first bracket aligned with the electrical box. A cover is positioned over the first bracket to conceal the first bracket. The electrical wires are passed through a central opening in the cover to an electrical fixture.

Other objects, advantages and salient features of the invention will become apparent from the following detailed description, which, taken in conjunction with the annexed drawings, discloses a preferred embodiment of the invention.

BRIEF DESCRIPTION OF THE DRAWINGS

Referring now to the drawings that form a part of the original disclosure:

FIG. 2 is a side elevational view in partial cross section of the surface mounted support assembly of FIG. 1 secured to a surface;

FIG. 3 is a perspective view of a mounting bracket of FIG. 1;

FIG. 4 is a top plan view of the mounting bracket of FIG. 3;

FIG. 5 is a side elevational view of the mounting bracket of FIG. 3;

FIG. 6 is a front elevational view of the mounting bracket of FIG. 3;

FIG. 10 is an upper perspective view of a support bracket of FIG. 1;

FIG. 11 is a lower perspective view of the support bracket of FIG. 10;

FIG. 12 is a top plan view of the support bracket of FIG. 10;

FIG. 13 is a side elevational view of the support bracket of FIG. 10;

FIG. 14 is a front elevational view of the support bracket of FIG. 10;

DETAILED DESCRIPTION OF THE INVENTION

Figure 1:
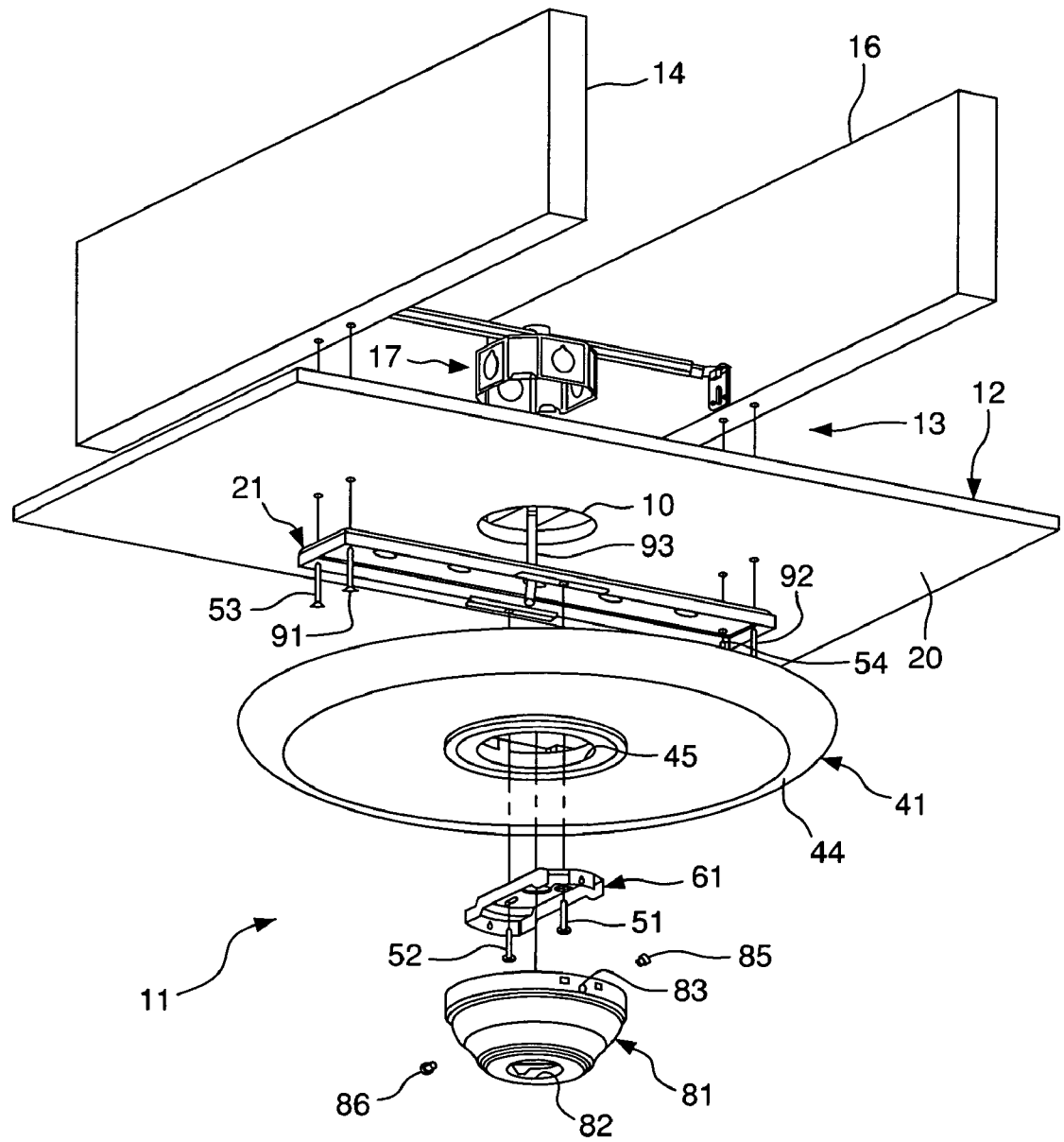
FIG. 1 is an exploded perspective view of a surface mounted support assembly according to the present invention.

As shown in FIGS. 1-18, a surface mounted support assembly 11 is securable to a support 13 and adapted to receive an electrical fixture 15, such as a fan. A first bracket 21 is adapted to be secured to the support 13 and has a plurality of openings 22-26 adapted to receive wiring from an electrical box 17 secured to the support. A cover 41 is connected to the first bracket 21 and is disposed over a majority of the first bracket. A cover ring 81 is connected to the cover 41 and is adapted to receive the electrical fixture 15.

As shown in FIGS. 1 and 2, a conventional electrical box 17 is secured to the support 13. Generally, the support 13 includes first and second joists 14 and 16 that extend substantially parallel to one another on an upper surface 18 of ceiling drywall 12. A brace assembly 19 is secured between the first and second joists 14 and 16, and the electrical box 17 is secured to the brace assembly. The electrical box 17 may be secured anywhere along the length of the brace assembly. An aperture 10 is made in the ceiling drywall 12 to provide access to the electrical box 17. The aperture 10 is generally positioned directly below the electrical box to facilitate mounting the electrical fixture 15. Electrical wires are passed from the electrical box 17, through the ceiling drywall aperture 10, and through the support assembly 11 to the electrical fixture 15.

The first bracket, or mounting bracket, 21 is secured to the support 13, as shown in FIGS. 1 and 2. A first fastener hole 27 in the first bracket 21 receives a first fastener 91 that passes through the ceiling drywall 12 and into a first joist 14 and a second fastener hole 28 in the first bracket 21 receives a second fastener 92 that passes through the ceiling drywall 12 and into a second joist 16, thereby securing the first bracket to the support 13. The first bracket 21 may have any suitable shape, but is shown as being substantially rectangular. As shown in FIGS. 3-6, the first bracket 21 has a first end 29 and a second end 30. The first fastener hole 27 is at the first end 29 of the first bracket 21 and the second fastener hole 28 is at the second end 30. Additional fastener holes 94 and 95 may be used to receive additional fasteners 53 and 54 to further secure the first bracket 21 to the support 13.

As shown in FIGS. 3-6, the first bracket 21 has a base 31 with front, rear and side walls 32-35 extending substantially perpendicularly upwardly from the base. A first wing 37 extends substantially perpendicularly outwardly from a first side wall 34. A second wing 38 extends substantially perpendicularly outwardly from a second side wall 35. Each of the wings 37 and 38 has a first fastener hole 39 and 40. As shown in FIG. 4, each of the wings 37 and 38 may have a second fastener hole 96 and 97. Alternatively, the first fastener holes 39 and 40 may be located in other positions on the first bracket 21, such as in the base 31. Preferably, the second fastener holes 96 and 97 are on opposite sides of the first fastener holes 39 and 40, as shown in FIG. 4. A plurality of openings 22-26 in the base 31 are adapted to receive electrical wires from the electrical box. Although five openings are shown, any suitable number of openings may be used. Preferably, the openings 22-26 are spaced along a longitudinal axis 36 of the first bracket 21, as shown in FIG. 4. The openings allow electrical wires from the electrical box 17 to be easily passed through the first bracket 21. Since the electrical box 17 may be positioned anywhere along the length of the brace assembly 19, there is no predetermined position at which the electrical box must be installed. Since the first bracket 21 spans the distance between the joists 14 and 16, as does the brace assembly 19, one of the plurality of openings 22-26 will be positioned below the installed electrical box 17 on the brace assembly 19 substantially proximal the aperture 10 in the ceiling drywall 12 to receive electrical wires 93 through one of the plurality of openings, as shown in FIG. 1. Preferably, the first bracket 21 is made of metal, such as steel.

Figure 7:
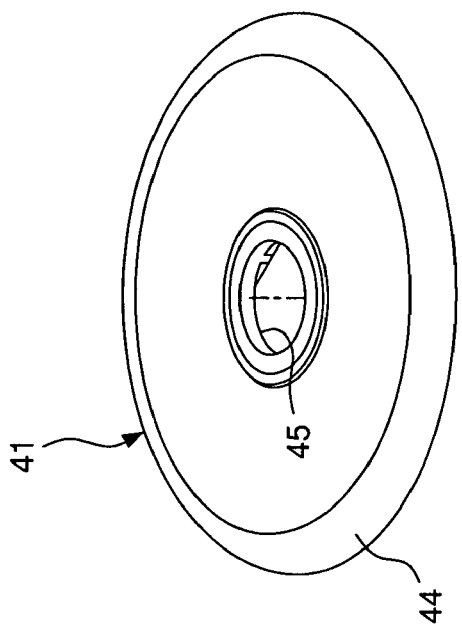
FIG. 7 is a perspective view of a cover of FIG. 1.
Figure 8:
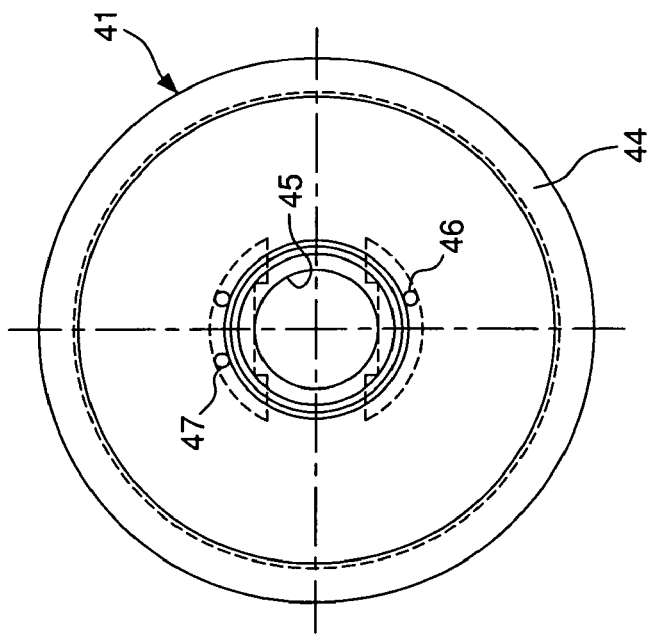
FIG. 8 is a top plan view of the cover of FIG. 7.
Figure 9:
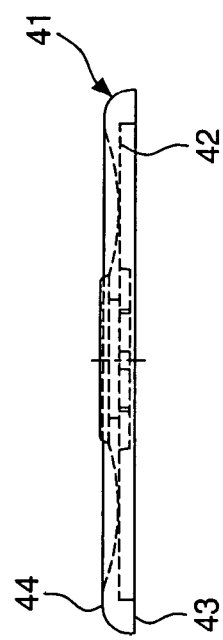
FIG. 9 is a side elevational view of the cover of FIG. 7.
Figure 15:
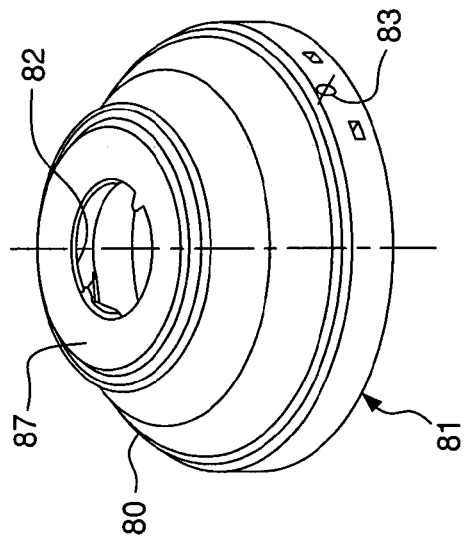
FIG. 15 is a perspective view of a cover ring of FIG. 1.
Figure 18:
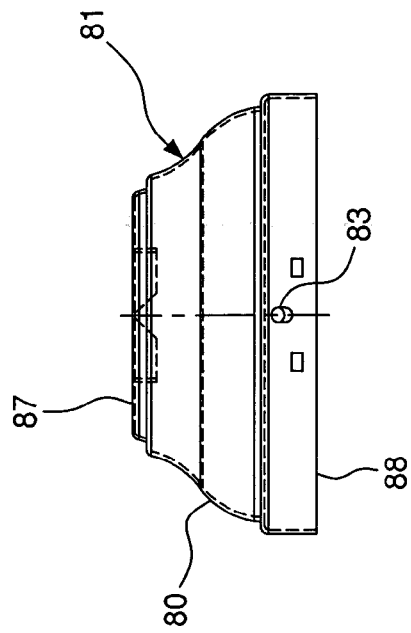
FIG. 18 is a front elevational view of the cover ring of FIG. 15.
Figure 16:
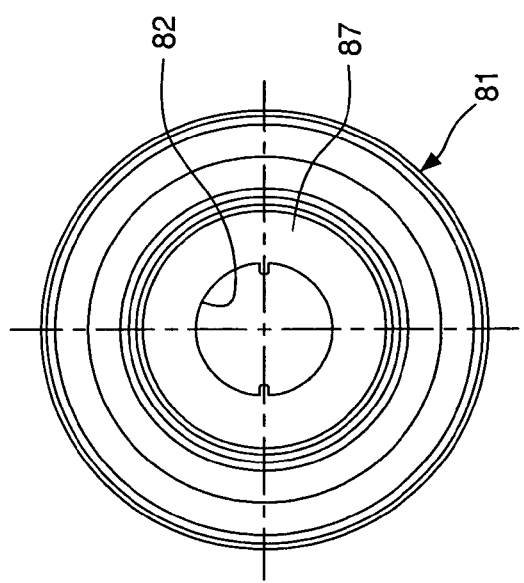
FIG. 16 is a top plan view of the cover ring of FIG. 15.
Figure 17:
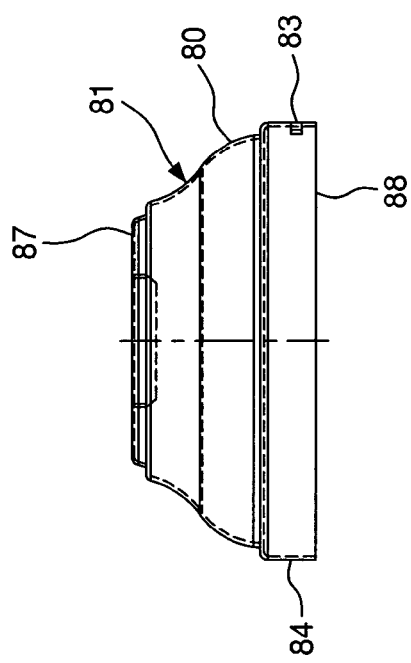
FIG. 17 is a side elevational view of the cover ring of FIG. 15.

The cover, or medallion, 41 is connected to the first bracket 21, as shown in FIGS. 1 and 2. A recess 42 in an upper surface 43 of the cover 41 receives the first bracket 21, as shown in FIG. 9. Preferably, the cover 41 is substantially circular, as shown in FIGS. 7-9. An aperture 45 in the cover 41 provides a passage for electrical wires 93. Preferably, the cover 41 substantially covers the first bracket 21, as shown in FIGS. 1 and 2, to conceal the first bracket from visibility when the surface mounted support assembly is installed. The cover 41 may be disposed over substantially a majority of the first bracket. Preferably, upper surface 43 of the cover 41 abuts the lower surface 20 of the ceiling drywall 12. As shown in FIG. 8, one embodiment of the cover 41 may have fastener holes 46 and 47 that receive fasteners to secure the cover to the first bracket 21. Fastener holes 46 and 47 are aligned with fastener holes 96 and 97 in the wings 37 and 38 of the first bracket 21 to secure the cover 41 to the first bracket. The fastener holes 46 and 47 may be of any shape, such as circular or a slot. Preferably, a cover ring 81 connected to the cover 41 conceals the fasteners inserted through fastener holes 47 and 47 from visibility. Preferably, the cover 41 is made of a polymer, such as polyurethane, polystyrene or a thermoset plastic material.

A second bracket, or support bracket, 61, as shown in FIGS. 10-14, is secured to the first bracket 21. The second bracket 61 secures the cover 41 between the second bracket and the first bracket 21, as shown in FIGS. 1 and 2. An opening 62 in the second bracket 61 allows electrical wires to be passed through the second bracket. A first tab 63 is positioned at one end of the second bracket 61, and a second tab 64 is disposed at an opposite end. Preferably, the first and second tabs 63 and 64 extend substantially perpendicularly from a base 65 of the second bracket 61. A fastener hole 66 and 67 is disposed in each of the first and second tabs 63 and 64. Elongated slots 68 and 69 in the base 65 of the second bracket 61 are adapted to receive fasteners 51 and 52. The elongated slots 68 and 69 allow the second bracket to be properly aligned with the cover 41 and first bracket 21.

The cover ring 81, as shown in FIGS. 15-18 is connected to the cover 41 and is adapted to receive the electrical fixture 15. The cover ring 81 has an upper surface 88, a lower surface 87 and a wall 80 extending therebetween. Preferably, the lower surface 87 of the cover ring is substantially circular. An opening 82 in the lower surface allows electrical wires 93 to be passed to the electrical fixture 15. The opening 82 is also adapted to receive the electrical fixture in a conventional manner, such a ball-joint connection between the cover ring 81 and the electrical fixture 15. Fastener holes 83 and 84 in the wall 80 are adapted to receive fasteners 85 and 86 to secure the cover ring to the second bracket 61.

ASSEMBLY AND DISASSEMBLY

As shown in FIG. 2, the surface mounted support assembly 11 is securely fastened to the support 13 and an electrical fixture 15 is securely fastened to the surface mounted support assembly. The electrical wires 93 may be easily passed to the electrical fixture 15 by passing the wires through one of the openings 22-26 in the first bracket 21 aligned with the aperture 10 formed in the ceiling drywall 12 to provide access to the electrical box 17. Alternatively, electrical wires 93 may be passed to the surface mounted support assembly 11 through the ceiling aperture without requiring an electrical box since the surface mounted support assembly secures the electrical fixture 15 to the support 13.

The first bracket 21 is secured to the first and second joists 14 and 16 of the support 13, as shown in FIGS. 1 and 3. Fasteners 91 and 53 are inserted through fastener holes 27 and 94 at the first end 29 of the first bracket and extend into the first joist 14. Fasteners 92 and 54 are inserted through fastener holes 28 and 95 at the second end 30 of the first bracket 21 and extend into the second joist 16. The base 31 of the first bracket 21 abuts the lower surface 20 of the ceiling drywall 12.

Electrical wires 93 are passed from the electrical box 17 through the aperture 10 formed in the ceiling drywall 12 to provide access to the electrical box. The electrical wires 93 are passed through one of the openings 22-26 in the first bracket 21 that is aligned with the aperture 10 in the ceiling drywall 12. Thus, the electrical box 17 may be positioned anywhere between the first and second joists 14 and 16, and the first bracket is still able to easily accommodate the electrical wires and pass them to the electrical fixture. This avoids wiring problems caused by the electrical box 17 not being perfectly centered between the first and second joists 14 and 16.

The cover 41 is then positioned over the first bracket 21, and the electrical wires are pulled through the cover aperture 45. A recess 42 in the cover receives the first bracket 21. In one embodiment, fasteners are inserted through fastener holes 46 and 47 in the cover 41 and into fastener holes 96 and 97 in the first bracket 21 to secure the cover to the first bracket. In another embodiment, the cover 41 is held in position over the first bracket 21 and the second bracket 61 secures the cover between the first and second brackets. Fasteners 51 and 52 are inserted through fastener slots 68 and 69 in the second bracket and into fastener holes 39 and 40 in the first bracket 21 to secure the second bracket to the first bracket. The outer edge of upper surface 43 of the cover 41 abuts the lower surface 20 of the ceiling drywall.

Alternatively, the first bracket 21 may be mounted adjacent the aperture 10 in the ceiling drywall 12. Electrical wires 93 may bypass the first bracket 21 and be passed through the cover aperture 45. The cover 21 is then positioned substantially over the first bracket 21 and the ceiling aperture 10 to conceal the first bracket from view.

The cover ring 81 is then positioned over the second bracket 61. Fasteners 85 and 86 are inserted through fastener holes 83 and 84 of the cover ring and into fastener holes 66 and 67 of the second bracket 61 to secure the cover ring to the second bracket. If the fasteners are used to secure the cover 41 to the first bracket 21, the cover ring will conceal the fasteners from visibility. The electrical wires 93 are pulled through the opening 82 in the cover ring 81, and are available for use with the electrical fixture 15. The electrical fixture 15 is connected to the cover ring 81 of the surface mounted support assembly 11 in any conventional manner.

While advantageous embodiments have been chosen to illustrate the invention, it will be understood by those skilled in the art that various changes and modifications may be made therein without departing from the scope of the invention as defined in the appended claims.

What is claimed is:

1. A surface mounted support assembly, comprising: a first bracket adapted to be secured to a support adjacent to and separately from an electrical box and having a plurality of openings adapted to receive wiring from the electrical box secured at any position to the support; first and second wings extending outwardly in substantially opposite directions from said first bracket, each of said first and second wings having at least one wing fastener hole; a cover connected to and disposed over said first bracket; and a cover ring connected to said cover and adapted to receive an electrical fixture; wherein a second bracket is secured to said first bracket to position said cover therebetween.

2. A surface mounted support assembly according to claim 1, wherein
   said cover is disposed over substantially a majority of said first bracket.

3. A surface mounted support assembly according to claim 1, wherein
   said first bracket has a first end and a second end, said first end being secured to a first support member and said second end being secured to a second support member.

4. A surface mounted support assembly according to claim 1, wherein
   a plurality of first fastener holes in said first bracket are adapted to receive a plurality of first fasteners to secure said first bracket to the support.

5. A surface mounted support assembly according to claim 1, wherein
   said plurality of openings are linearly aligned along a longitudinal axis of said first bracket.

6. A surface mounted support assembly according to claim 1, wherein
   said cover is secured to said first and second wing fastener holes.

7. A surface mounted support assembly according to claim 1, wherein
   said first and second wing fastener holes receive fasteners to secure said second bracket to said first bracket.

8. A surface mounted support assembly according to claim 1, wherein
   said first bracket has a plurality of second fastener holes adapted to receive a plurality of second fasteners to secure said cover to said first bracket.

9. A surface mounted support assembly, comprising:
a first bracket adapted to be secured to first and second support members and having a plurality of openings adapted to receive wiring from an electrical box secured at any position between the first and second support members;
first and second wings extending outwardly in substantially opposite directions from said first bracket, each of said first and second wings having at least one wing fastener hole;
a cover connected to and disposed over said first bracket, said cover substantially covering said first bracket;
a second bracket secured to said first bracket; and
a cover ring secured to said second bracket and adapted to receive an electrical fixture.

10. A surface mounted support assembly according to claim 9, wherein
said cover is disposed over substantially a majority of said first bracket.

11. A surface mounted support assembly according to claim 9, wherein
a plurality of first fastener holes in said first bracket are adapted to receive a plurality of first fasteners to secure said first bracket to the first and second support members.

12. A surface mounted support assembly according to claim 9, wherein
said plurality of openings are linearly aligned along a longitudinal axis of said first bracket.

13. A surface mounted support assembly according to claim 9, wherein
said cover is secured to said first and second wing fastener holes.

14. A surface mounted support assembly according to claim 9, wherein
said second bracket is secured to said first and second wing fastener holes.

15. A surface mounted support assembly according to claim 9, wherein
said first bracket is substantially rectangular.

16. A surface mounted support assembly according to claim 9, wherein
said cover has a recess to receive said first bracket.

17. A surface mounted support assembly according to claim 9, wherein
said first bracket has a plurality of second fastener holes adapted to receive second fasteners to secure said cover to said first bracket.

18. A surface mounted support assembly according to claim 9, wherein
said first bracket has a plurality of second fastener holes adapted to receive a plurality of second fasteners to secure said second bracket to said first bracket.

19. A method of securing a surface mounted support assembly to an existing support member, comprising the steps of:
securing a first bracket to the support member adjacent to and separately from an electrical box, the first bracket having first and second wings extending outwardly in substantially opposite directions and each of the wings having at least one wing fastener hole;
positioning a cover over the first bracket to substantially conceal the first bracket;
passing electrical wires from the electrical box connected to the support member through a central opening in the cover to an electrical fixture; and
securing a second bracket to the first bracket to secure the cover between the first and second brackets.

20. A method of securing a surface mounted support assembly to an existing support member according to claim 19, comprising the steps of:
passing electrical wires from the electrical box to the cover through one of a plurality of openings in the first bracket aligned with the electrical box.

21. A method of securing a surface mounted support assembly to an existing support member according to claim 19, comprising the steps of:
passing electrical wires from the electrical box to the cover without passing the wires through the first bracket.

22. A method of securing a surface mounted support assembly to an existing support member according to claim 19, further comprising securing a cover ring to the second bracket to conceal the second bracket.

23. A method of securing a surface mounted support assembly to an existing support member according to claim 19, further comprising
securing said first bracket over an aperture in a ceiling.

24. A method of securing a surface mounted support assembly to an existing support member according to claim 19, further comprising
securing said first bracket adjacent an aperture in a ceiling.

* * * * *